United States Patent
Methany et al.

[19]

[11] Patent Number: 5,950,970
[45] Date of Patent: Sep. 14, 1999

[54] CABLE CLAMP DAMPER

[75] Inventors: Alfred Paul Methany, Jupiter; Clifton O. McGhee, West Palm Beach, both of Fla.

[73] Assignee: United Technologies Corporation

[21] Appl. No.: 08/772,839

[22] Filed: Dec. 24, 1996

[51] Int. Cl.$^6$ .................................................. A47G 23/02
[52] U.S. Cl. ........................... 248/150; 248/65; 248/570; 248/74.1
[58] Field of Search ................................ 248/150, 65, 73, 248/74.1, 74.2, 74.3, 230.1, 218.4, 541, 539, 570

[56] References Cited

U.S. PATENT DOCUMENTS

| | | | |
|---|---|---|---|
| 2,641,808 | 6/1953 | Tinnerman | 248/74.3 |
| 4,006,874 | 2/1977 | McGee | 248/74.3 |
| 4,248,459 | 2/1981 | Pate et al. | 248/74.3 |
| 4,783,038 | 11/1988 | Gilbert et al. | 248/570 |
| 4,919,370 | 4/1990 | Martin et al. | 248/73 |
| 4,971,272 | 11/1990 | Gudridge et al. | 248/74.3 |
| 5,435,506 | 7/1995 | Wiley | 248/74.1 |
| 5,499,790 | 3/1996 | Hay | 248/570 |
| 5,690,322 | 11/1997 | Hay | 267/148 |

FOREIGN PATENT DOCUMENTS

| | | | |
|---|---|---|---|
| 0246972 | 6/1969 | U.S.S.R. | 248/74.3 |
| 2080676 | 2/1982 | United Kingdom | 248/74.1 |

*Primary Examiner*—Leslie A. Braun
*Assistant Examiner*—Kimberly Wood
*Attorney, Agent, or Firm*—Norman Friedland

[57] ABSTRACT

A cable clamp damper utilizing wire cable is looped to define a toroidal configuration and is mounted on a split sleeve. The sleeve's circumference is less than the tube or hardware being supported by the clamp so as to define a small gaps between the halves to allow the individual strands of the cable to move relative to each other to dissipate the energy of vibrations encountered by the tube or hardware. The wire is fitted to base members that are adapted to be mounted to support structure to secure the tube or hardware in place.

6 Claims, 5 Drawing Sheets

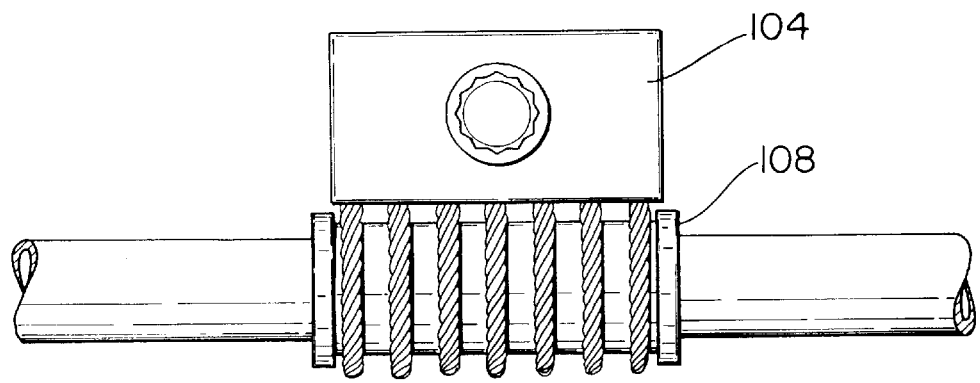
FIG. 10
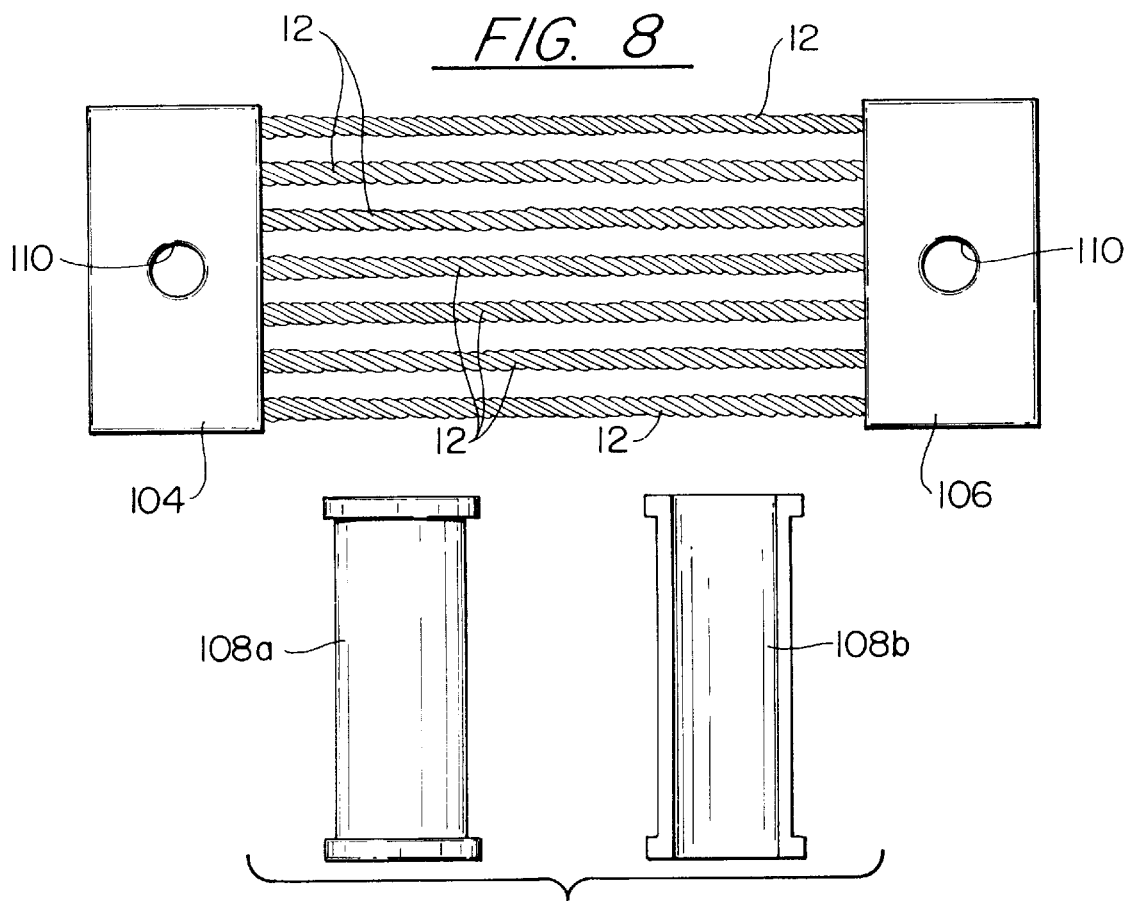
FIG. 8
FIG. 9

CABLE CLAMP DAMPER

This invention was made under a U.S. Government contract and the Government has an interest herein.

TECHNICAL FIELD

This invention relates to clamps and particularly to damping means in combination with the clamp for clamping tubes, piping, hardware and the like in a highly vibrational environment.

BACKGROUND ART

As is known by one skilled in the aeronautical field, the pipes and tubes used to conduct fluids and hardware in a gas turbine engine are exposed to a hostile environment with exceptionally high vibrations. Obviously, the constant rubbing of the pipes, tubes or hardware attached to the casing of an aircraft gas turbine engine is subjected to wear and fatigue. This invention contemplates the use of dampers incorporated into the clamp for clamping the pipes or tubes to the engine case. According to this invention the damper is a means for isolating a component from the vibrations of its support. The damper comprises wire bundles or braided wire that is judiciously attached to the attachment mechanism which in turn is wrapped around the tube in a discrete manner so as to allow the wire to dissipate the vibratory energy.

There are a plethora of clamps that are disclosed in the prior art that are "U" shaped, "C" shaped and "O" shaped and the like that primarily serve to secure pipes, hardware, tubes and the like. For the most part these devices are primarily concerned with the fit of the fastener and particularly the ability to tighten it. Others are concerned with expansion and contraction and provide compensation means. Examples of such fasteners are disclosed in U.S. Pat. Nos. 3,843,083 granted to Angibaud on Oct. 22, 1974 entitled "Mounting Apparatus For Portable Device", 1,140,535 granted to Schroeder on May 25, 1915 entitled "Removable Core For Metal Barrels", 5,167,353 granted to Hughes on Dec. 1, 1992 entitled "U" Post Bracket For Bicycles", 4,826,114 granted to Umehara on May 2, 1989 entitled "Pipe and Clamp Combination", 3,817,564 granted to Baldwin et al on Jun. 18, 1974 entitled "Clamp Assembly For Pressure Vessel", 2,451,405 granted to Oakes on Oct. 12, 1948 entitled "Combination Clamp and Closure" and 4,817,897 granted to Kreusel on Apr. 4, 1989 entitled "Cross-Connector To Two crossing Tubular Elements".

As mentioned in the above paragraph this invention is primarily concerned with isolating the secured member from the vibrations of the support. The damping is effectuated by the small wires that form the cable that surrounds the member being supported. Of importance to this type of construction is the fact that it is easy to fabricate, assemble and the weight is relatively low and the unit is economical to build. The damping enhances the life of the component being supported.

SUMMARY OF THE INVENTION

An object of this invention is to provide improved damping means for attaching the tubes or hardware to support structure in order to minimize the effect attendant high vibrations.

A feature of this invention is to surround a sleeve that supports a component intended to be fastened with a bundle of small wires so that the wires are capable of moving and rubbing against each other and the sleeve to dissipate vibratory energy. The sleeve discretely fits the member being supported to assure frictional movement of the wires. In another embodiment the wire wraps around the mechanism intended to be protected and attaching the support member to a support. The clamp employing this damping means is characterized as being easy to fabricate and assemble, and low in cost and weight.

The foregoing and other features of the present invention will become more apparent from the following description and accompanying drawings.

BRIEF DESCRIPTION OF DRAWINGS

FIG. 8 is a view in elevation illustrating another embodiment of this invention;

FIG. 9 is a view in elevation illustrating both halves of the wear sleeve of the invention; and FIG. 10 is a view in elevation illustrating the assembled clamp/damper of this invention.

DETAILED DESCRIPTION OF THE PREFERRED EMBODIMENT

Figure 1:
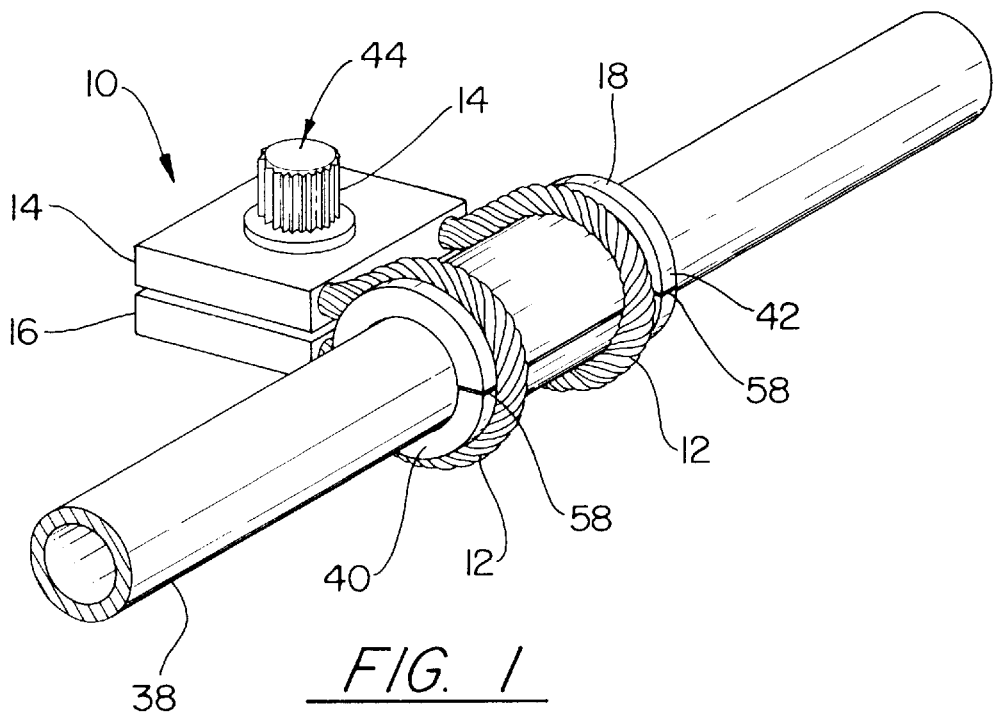
FIG. 1 is a view in perspective illustrating the clamp/damper of this inventions supporting a tube.
Figure 2:
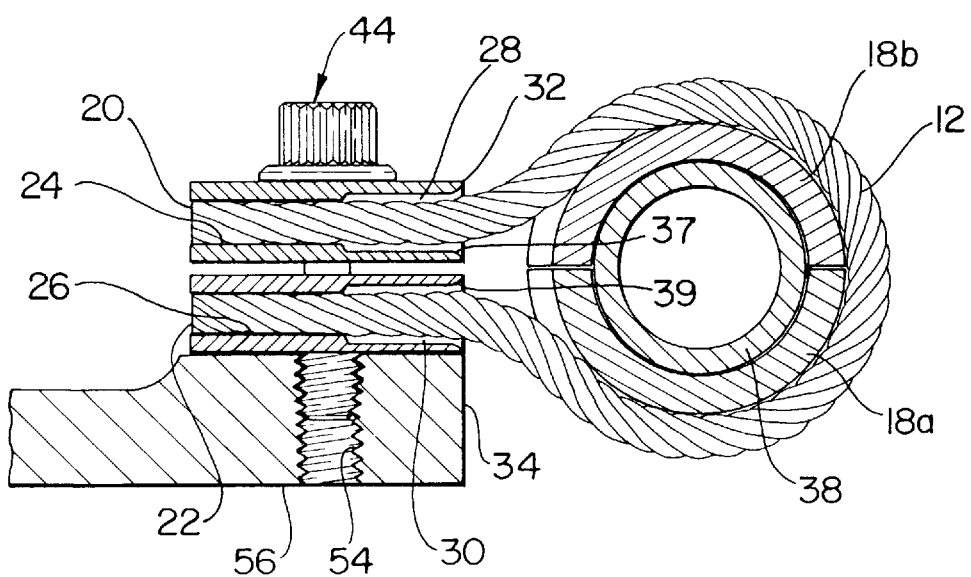
FIG. 2 is a sectional view of the embodiment depicted in FIG. 1 illustrating the clamp and wire cable joint.
Figure 3:
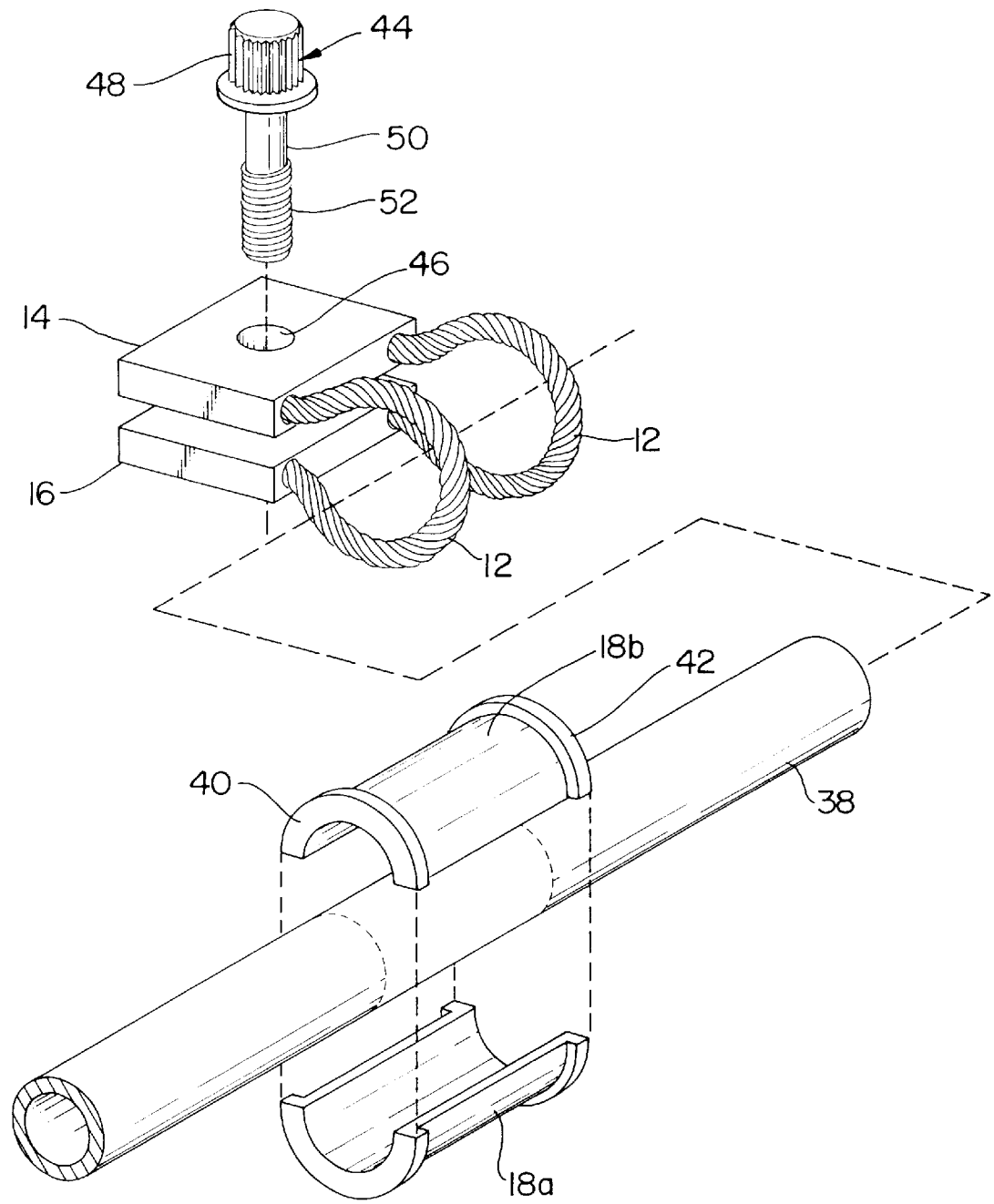
FIG. 3 is an exploded view in perspective illustrating the assembly of the clamp/damper to the tube being supported.

Referring to FIGS. 1–3 the wire cable clamp of this invention comprises a clamp/damper generally indicated by reference numeral 10 having a flexible wire cables 12 (two in this embodiment), base plates 14 and 16 and split sleeve 18. The cable 12 is commercially available and consists of individual wires made from stainless steel or other metals or alloys thereof and formed into strands of a given diameter and each strand is twisted or braided to form the cable. The particular metallic material for the wire of the cable is dictated by the environment in which it is being utilized.

The ends 20 and 22 of each of the cables 12 fit into the straight through bores 24 and 26, respectively. The bores 24 and 26 have an increased diameter portion 28 and 30, respectively adjacent to the ends 32 and 34 of the base plate plates 20 and 22 and remote from the ends of the cables 20 and 22, respectively. The end of each cable 20 and 22 may be brazed or welded to the smaller diameter portion of bores 24 and 26 in order to secure the base plates to the respective cables. The edge of the bores 20 and 22 adjacent the ends 32 and 34, respectively may be chamfered in order to avoid rubbing of the cable 12 and hence fraying the small diameter wire of the cables. In installing the tube 38 when in the clamped position, the sleeve 18 which is formed in two halves is placed around the tube 38 and the flexible cable 12 is wrapped around the sleeve 18 between the end flanges 40 and 42. The bolt 44 extends through complementary drilled holes 46 (only one being shown) formed the plates 14 and 16. While any type of bolt or fastener may be used without departing from the scope of this invention, in this instance a commercially available machine bolt 44 having a tool engaging enlarged diameter head 48 a shank 50 and threads 52 formed on the ends thereof is used. The bolt 44 passes through the aligned holes 46 and into the threaded bore 54 formed in the member 56 supporting the clamp 10 and, in turn, tube 38.

The sleeve 18 is formed in two halves 18a and 18b and the circumference of the sleeve 18 is made slightly smaller than the circumference of the tube 38 to define the gap 58 to assure that the cables 12 are tightly fitted and that the vibrations will be dissipated by the individual small wires of the cables 12. The vibrations cause the wires to move within the cable and the friction between moving wires will dissipate the energy of the vibrations generated from an engine and hence, isolate the vibrations from the tube. This structure makes for a damper that is easy to fabricate and install on an engine and is realistically inexpensive in comparison to heretofore known damping devices.

Figure 4:
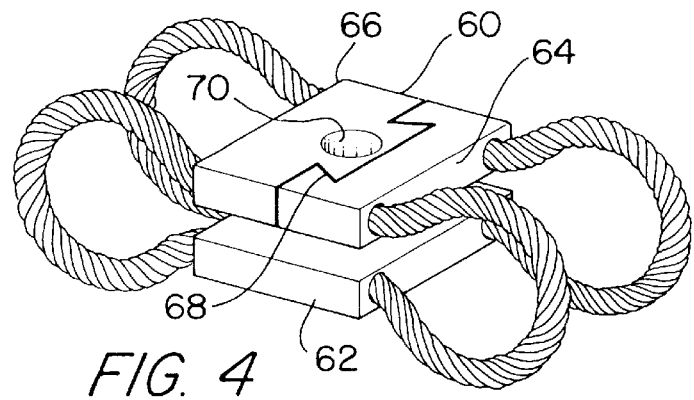
FIG. 4 is a view in perspective exemplifying another embodiment of the invention.

FIG. 4 exemplifies another embodiment of the invention where the clamp/damper is utilized to support tandem tubes. As noted, the cables 12 are similarly secured in the base plates 60 and 62 and extend from the diametrically opposed surfaces on the front edge 64 and back edge 66. Both the base plates 60 and 62 are substantially identical and similar to the FIG. 1 configuration. The major difference is that the top plate 60 is formed into two sections 60a and 60b and are fitted to each other by the tongue and groove fitting 68. This allows the cables 12 to wrap around the respective tubes intended to be supported. The complementary bores 70 (only one being shown) serve to receive the bolt for securing the clamp and tubes as desired.

Figure 5:
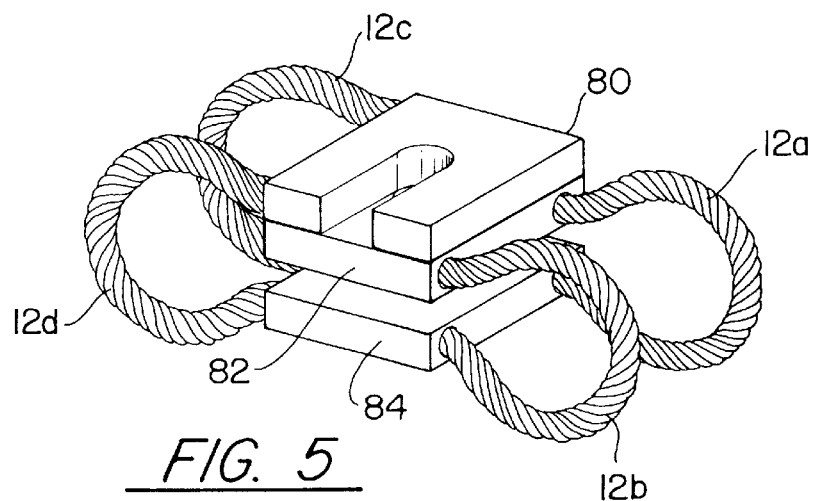
FIG. 5 exemplifies another embodiment and is shown in perspective.

FIG. 5 illustrates a still further embodiment where three base plates 80, 82 and 84 are utilized. In this embodiment the ends of wire cables 12a and 12b (the same reference numerals depict like elements in the all of the Figs.) are inserted in base plates 82 and 84. The ends of wire cables 12c and 12d are inserted in base plates 80 and 84. This allows the flexible cables 12 to wrap around each of the tandem mounted tubes (not shown).

Figure 6:
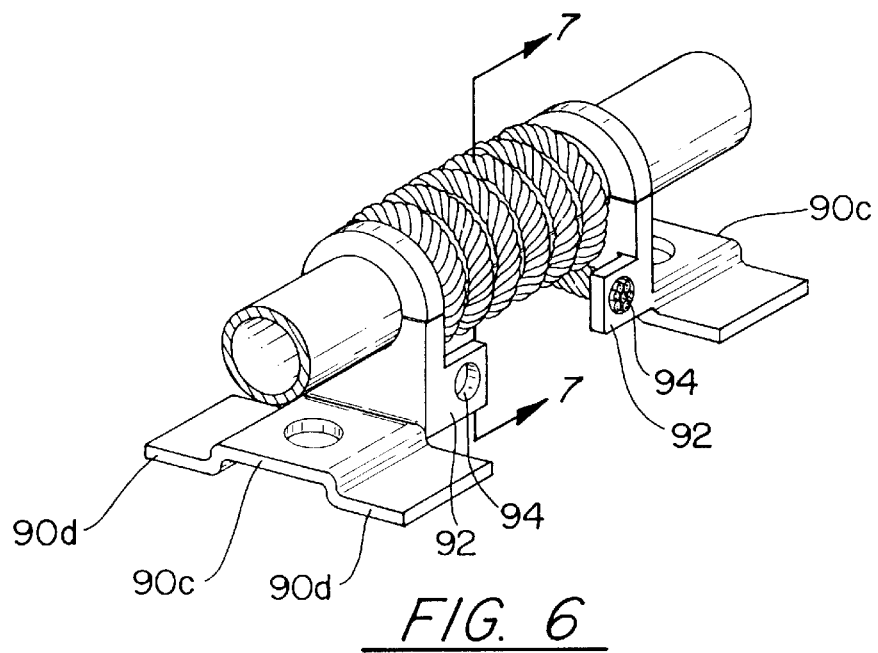
FIG. 6 is a view in perspective illustrating another embodiment of this invention.
Figure 7:
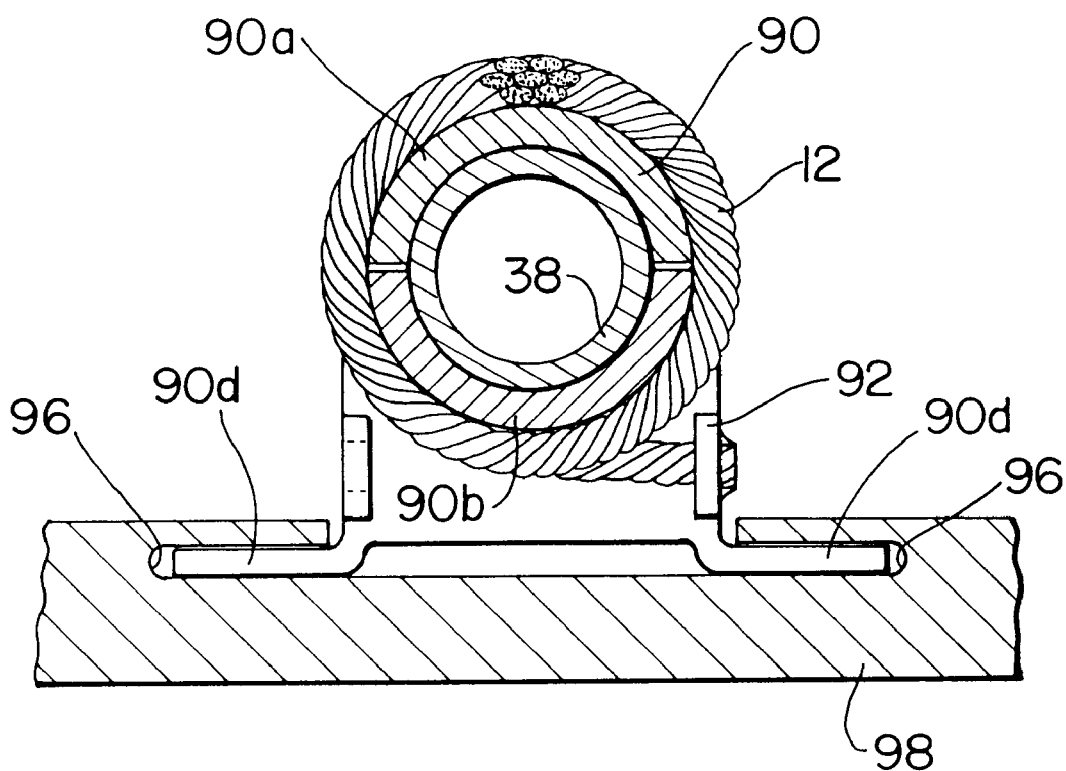
FIG. 7 is a sectional view taken along lines 7—7 of FIG. 6.

FIGS. 6 and 7 exemplify another embodiment where the clamp is formed in a retaining structure for a tongue and groove fit. In this embodiment the sleeve 90 which is similar to the sleeves in all the other embodiments includes an upper half portion 90a and a lower half portion 90b. The lower portion 90b includes an inner facing projections 92 each of which include a straight through drilled hole 94. The ends of the cable 12 are wrapped around the sleeve 90 which has already been installed relative to the tube 38, and is helically wound so that each of the ends of the wire cable 12 fit in the holes 94 and are brazed or welded thereto. Obviously, the ends of the wire cable can be made larger to afford sufficient material to grab on to and then it can be pulled so as to tighten the cable to the desired tightness. The lower portion 90b may also include a flange like member 90c formed on either end of the sleeve that carries the tongue portion 90d that fits into the groove 96 formed in the structure 98 to which the clamp is supported.

The embodiment exemplified in FIGS. 8, 9 and 10 utilize a plurality of equally spaced wire cables 12 attached to the base plates 100 and 102 similar to the attachment described in connection with FIG. 1. The base plates 104 and 106 are the same as base plates 14 and 16 (FIG. 1) except for the additional bores for accommodating the additional cables 12. The sleeve halves 108a and 108b are first mounted around tube 38 and the wire cable is wrapped around the sleeve 108 until the holes 110 formed in each base plate align with each other. A suitable bolt 44 is utilized to secure the clamp/damper to a support structure as was shown in the other embodiments.

What has been shown by this invention is a simple, economical and effective way of isolating the tube or hardware being supported by a clamp from vibrations so as to enhance the life of the components.

Although this invention has been shown and described with respect to detailed embodiments thereof, it will be appreciated and understood by those skilled in the art that various changes in form and detail thereof may be made without departing from the spirit and scope of the claimed invention.

We claim:

1. A braided wire cable clamp damper for supporting tubes or hardware to an engine generating vibrations, including a wire cable having individual strands of wire forming opposing ends, a split sleeve having a circumference adapted to be smaller than the circumference of the tube or hardware defining a gap, a pair of base members each affixed to one of said opposing ends to define a loop when said pair of base members are placed in abutting relationship, and means for securing said pair of base members to each other, whereby the vibrations generated by the engine cause the strands of wire to move within the cable and the friction between the moving wires dissipate the energy of the vibrations.

2. A braided wire cable damper for supporting tubes or hardware as claimed in claim 1 including a second wire cable having opposing ends, one of said ends being attached to one of said base members and the other of said ends being attached to the other of said base members to define another loop disposed parallel to and spaced from said loop for engaging said sleeve.

3. A braided wire cable damper for supporting tubes or hardware as claimed in claim 2 wherein each of said base members includes at least one elongated bore having an increased diameter at an end of said bore adjacent to said split sleeve, the ends of said wire cable fitted into said bores and bonded to said base member at point in said bore away from said increased diameter.

4. A braided wire cable damper for supporting tubes or hardware as claimed in claim 3 wherein each said base member at the edge of said bore at said increased diameter is chamfered.

5. A braided wire cable damper for supporting tubes or hardware as claimed in claim 4 including attaching means for attaching said base members to each other and tightening said cable around said sleeve to exert a force on said tube or hardware and tending to close said gap.

6. A combination of a clamp and damper for supporting tubes or hardware including a braided wire cable having opposing ends for dissipating energy from vibrations generated by an engine, a pair of base members, one of said ends of said wire cable being attached to one of said base members, the other of said ends being attached to the other of said base members, said wire cable being looped to from a generally toroidal member and said base members being placed in abutting position relative to each other, a split sleeve having complementary halves adapted to fit over the tubes or hardware and within said toroidal member and adapted to be smaller in diameter than said tubes or hardware, said complementary halves having end portions and said end portions defining a gap when said sleeve is fitted to said tube or hardware, said wire cable secures both of said halves and bears thereagainst, whereby the wires of said cable are tightly fitted around the sleeve so that the wires are capable of moving and rubbing against each other and the sleeve to dissipate the energy produced by said vibrations.

* * * * *

UNITED STATES PATENT AND TRADEMARK OFFICE
CERTIFICATE OF CORRECTION

PATENT NO. : 5,950,970
DATED : September 14, 1999
INVENTOR(S) : Methany et al

It is certified that error appears in the above-identified patent and that said Letters Patent is hereby corrected as shown below:

Title page, item [19] and [75]
Change the inventor's name "Methany" to --Matheny--

Signed and Sealed this

Twenty-fifth Day of July, 2000

Attest:

Q. TODD DICKINSON

*Attesting Officer*       *Director of Patents and Trademarks*